US010329092B2

United States Patent
Nothum, Jr. et al.

(10) Patent No.: US 10,329,092 B2
(45) Date of Patent: Jun. 25, 2019

(54) PIVOTING AND REVERSIBLY EXPANDING-CONTRACTING TRANSFER CONVEYOR FOR FOOD PROCESS LINES

(71) Applicants: Robert G. Nothum, Jr., Willard, MO (US); Ryan Doyle Nothum, Springfield, MO (US)

(72) Inventors: Robert G. Nothum, Jr., Willard, MO (US); Ryan Doyle Nothum, Springfield, MO (US)

( * ) Notice: Subject to any disclaimer, the term of this patent is extended or adjusted under 35 U.S.C. 154(b) by 0 days.

(21) Appl. No.: 15/941,635

(22) Filed: Mar. 30, 2018

(65) Prior Publication Data

US 2018/0282074 A1    Oct. 4, 2018

Related U.S. Application Data

(60) Provisional application No. 62/648,613, filed on Mar. 27, 2018, provisional application No. 62/577,375, filed on Oct. 26, 2017, provisional application No. 62/560,392, filed on Sep. 19, 2017, provisional application No. 62/545,634, filed on Aug. 15, 2017, provisional application No. 62/478,822, filed on Mar. 30, 2017.

(51) Int. Cl.
| | |
|---|---|
| *B65G 41/02* | (2006.01) |
| *B65G 15/22* | (2006.01) |
| *B65G 15/60* | (2006.01) |
| *B65G 41/00* | (2006.01) |
| *A23P 20/12* | (2016.01) |
| *B65G 21/14* | (2006.01) |
| *A47J 37/12* | (2006.01) |
| *B65G 21/08* | (2006.01) |

(52) U.S. Cl.
CPC ............. *B65G 15/22* (2013.01); *A23P 20/12* (2016.08); *B65G 15/60* (2013.01); *B65G 21/14* (2013.01); *B65G 41/005* (2013.01); *A47J 37/1276* (2013.01); *B65G 21/08* (2013.01); *B65G 41/02* (2013.01); *B65G 2201/0202* (2013.01)

(58) Field of Classification Search
CPC .................................. B26D 7/32; B65G 15/22
USPC ......................................................... 198/837
See application file for complete search history.

(56) References Cited

U.S. PATENT DOCUMENTS

| 4,132,156 A | * | 1/1979 | Glaze, Jr. | ............... B31B 50/00 |
| | | | | 493/136 |
| 5,172,636 A | * | 12/1992 | Theurer | .................. E01B 27/10 |
| | | | | 104/2 |

(Continued)

FOREIGN PATENT DOCUMENTS

| DE | 10 2004 062 137 | 2/2006 | ............... A23G 3/20 |
| DE | 20 2009 016 645 | 5/2011 | ............. B65G 47/08 |

(Continued)

OTHER PUBLICATIONS

NL Search Report, Appln. No. NL 2020691 dated Jan. 15, 2019.

*Primary Examiner* — Gene O Crawford
*Assistant Examiner* — Lester Rushin, III
(74) *Attorney, Agent, or Firm* — Jonathan A. Bay

(57) ABSTRACT

A transfer conveyor for food process lines is equipped with hardware to enable pivoting in place and other hardware to enable and reversible expansion and contraction of the transfer conveyor, or at least the upper, food-product carrying run of the endless conveyor belt therefor.

3 Claims, 8 Drawing Sheets

(56) References Cited

U.S. PATENT DOCUMENTS

| | | | | |
|---|---|---|---|---|
| 5,846,046 A * | 12/1998 | Warburton | ............ | A01D 90/08 |
| | | | | 414/552 |
| 2009/0294246 A1 | 12/2009 | Pogue | .................... | B65G 17/28 |
| 2011/0311685 A1 | 12/2011 | Hogan et al. | .......... | A23C 19/00 |
| 2012/0070553 A1 | 3/2012 | Hockett et al. | ......... | A47J 37/12 |
| 2015/0239591 A1* | 8/2015 | Bialy | .................... | B65G 37/00 |
| | | | | 53/517 |
| 2016/0167888 A1 | 6/2016 | Messina | ................ | B65G 41/00 |

FOREIGN PATENT DOCUMENTS

| | | | | |
|---|---|---|---|---|
| EP | 1 127 496 | 2/2000 | ............... | A23L 1/31 |
| EP | 2 481 295 | 8/2012 | ............... | A23L 1/00 |

\* cited by examiner

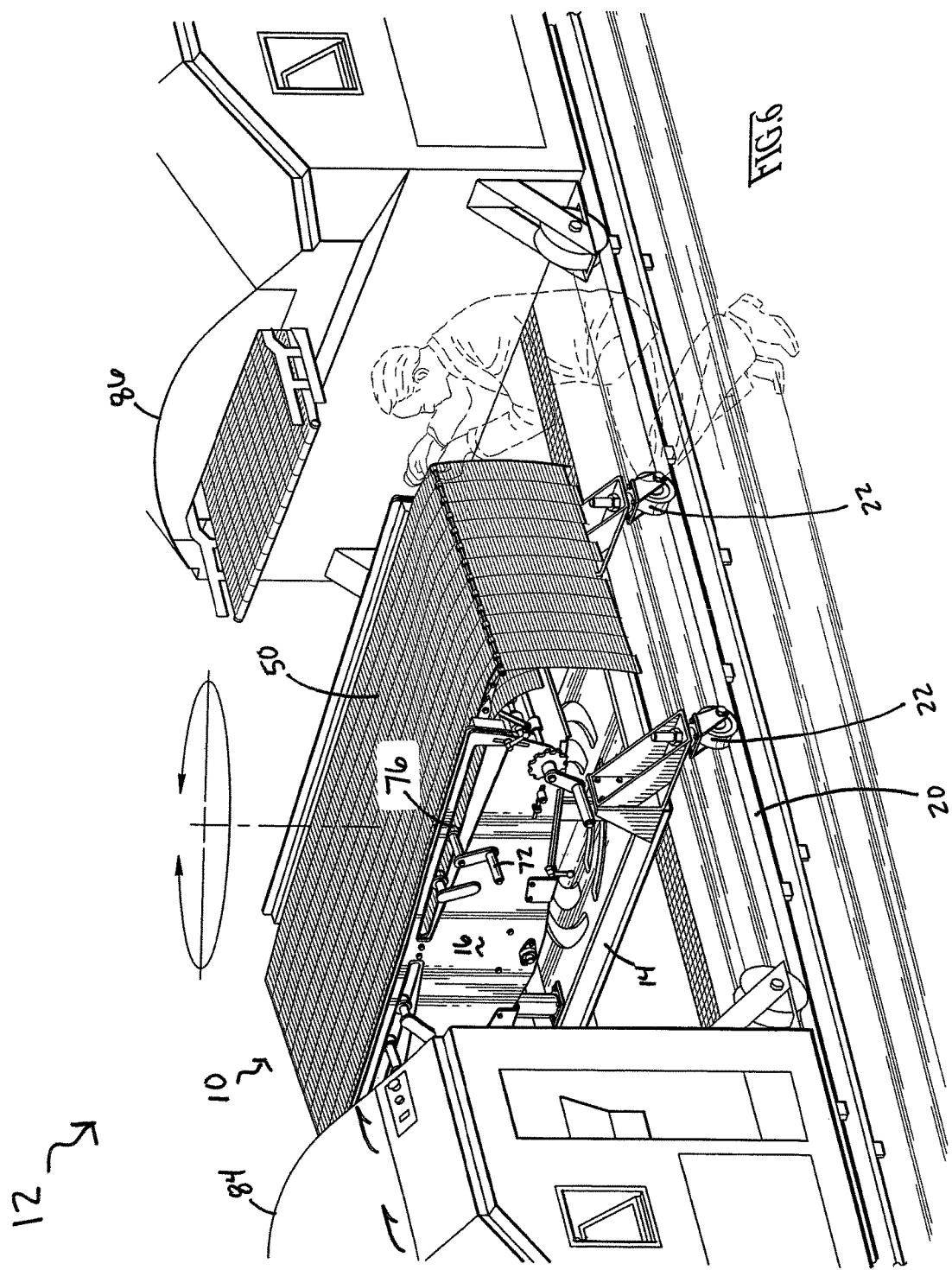

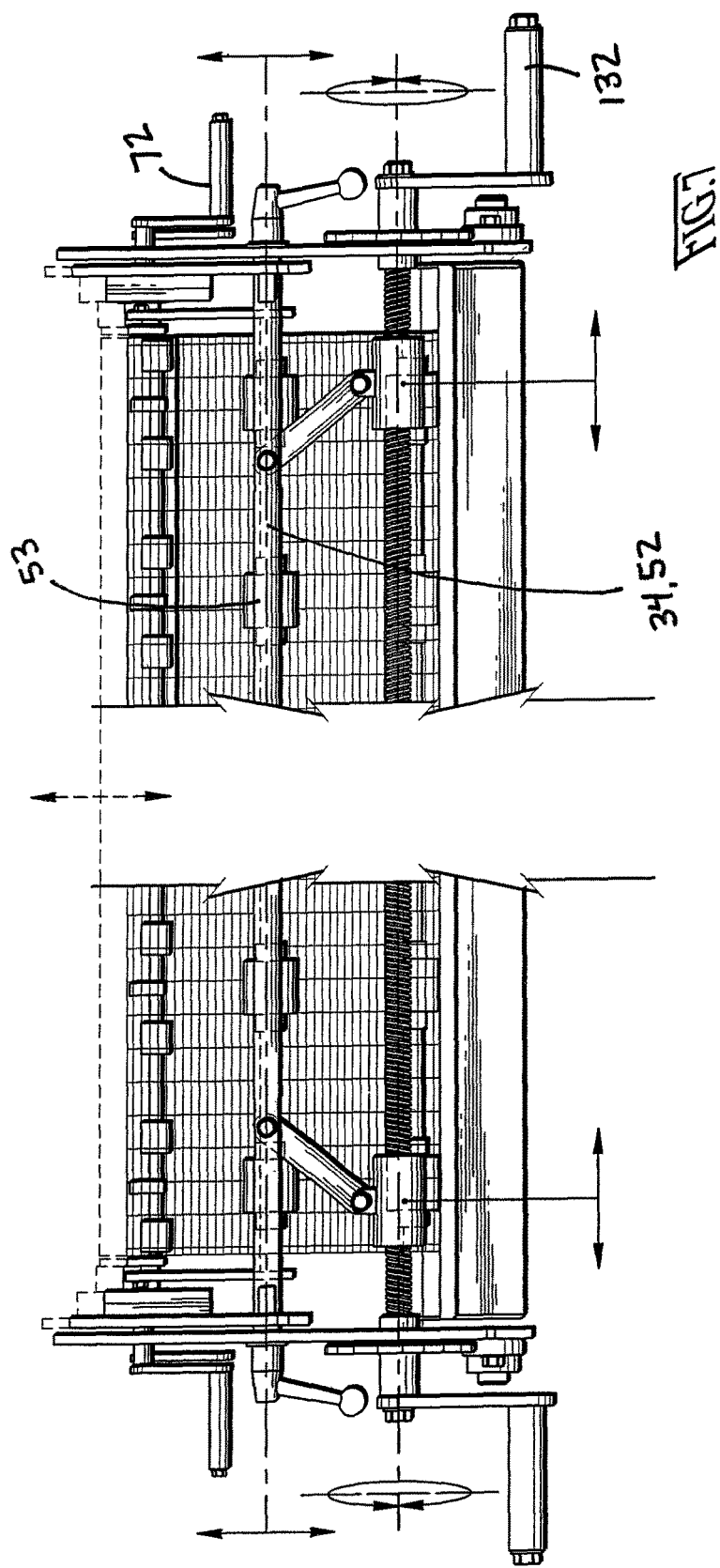

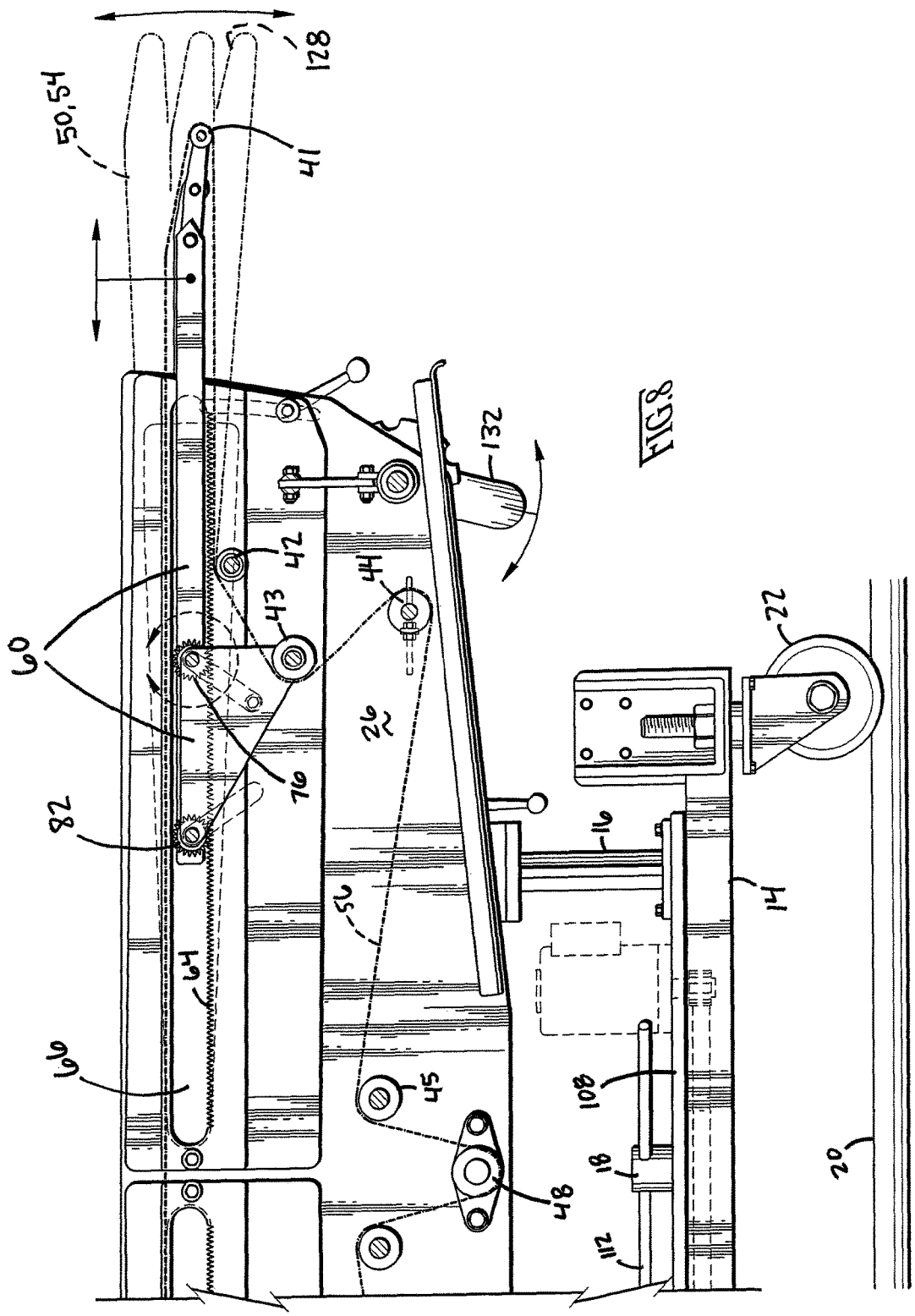

US 10,329,092 B2

PIVOTING AND REVERSIBLY EXPANDING-CONTRACTING TRANSFER CONVEYOR FOR FOOD PROCESS LINES

CROSS-REFERENCE TO PROVISIONAL APPLICATION(S)

This application claims the benefit of U.S. Provisional Application No. 62/478,822, filed Mar. 30, 2017; U.S. Provisional Application No. 62/545,634, filed Aug. 15, 2017; U.S. Provisional Application No. 62/560,392, filed Sep. 19, 2017; U.S. Provisional Application No. 62/577,375, filed Oct. 26, 2017; and U.S. Provisional Application No. 62/648,613, filed Mar. 27, 2018. The foregoing patent disclosures are incorporated herein by this reference thereto.

BACKGROUND AND SUMMARY OF THE INVENTION

The invention generally relates to mechanized and/or automatic food-process line equipment and, more particularly, to a pivoting and reversibly expanding-contracting transfer conveyor for food process lines.

A non-limiting example of a food process line might comprise the following series of machines in a line. Let's assume that the food product is chicken tender pieces which are going to pre-dusted with spices and perhaps flour, dipped in batter and bread-coated twice, then fried. Hence the given food process line might comprise the following series of machines:—
- a loader of (typically raw) food product;
- a transfer conveyor (ie., the first);
- a tumbling pre-dust coating machine;
- a transfer conveyor (the second);
- a batter coating machine;
- a tumbling bread crumb coating machine;
- a transfer conveyor (the third);
- another batter coating machine;
- another tumbling bread crumb coating machine;
- a transfer conveyor (the fourth); and
- a fryer (and likely a freezing and packaging process too).

In the above example, there are four transfer conveyors. In this example, each transfer conveyor is attended by perhaps six workers (eg., three on each side) who 'style' and 'grade' the food product on the transfer conveyor as the food product transits along.

In the industry, 'styling' refers to (among things) spreading the individual pieces of the food product evenly across the transfer table such that the individual pieces are not touching another piece and are otherwise organized in a relatively neat array. 'Grading' means picking out pieces which do not meet a quality or specification criteria (eg., too big, too little) and discarding the piece.

It will be noticed in the above example that, the transfer conveyors follow dry coating processes, not wet ones (eg., the two batter coating machines). There is a preference to not have the workers grade and style product immediately after a wet coating processes, because it is too messy, but instead just do it after dry coating processes.

One aspect of operating food process lines is that, since the output of the line is headed out into the public food supply, the food process line is subject to various inspectors including government inspectors (typically USDA). If the food process line is found to fail an inspection, all the food product outputted by that food process line is likely to be subject to recall:—or that is, all the food product outputted since the last washing of the food process line.

So if the food process line is washed once a week, and the failure determination is made at the end of the week, then a whole week's worth of output product has to be recalled.

In contrast, if the food process line is washed nightly, then the worst case scenario is that any recall will be limited to one day's worth of output product.

Hence, in choosing how frequently to wash, there is a balance of equities such as follows:—
- run the food process line for as long as practical to optimize run time vs. down time (ie., down time as for performing washing operations);

versus,
- wash frequently to reduce the risk of having a huge recall.

It is an object of the invention to provide improvements for decreasing the downtime for washing operations, thereby increasing the appeal of washing frequently. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 6 is a perspective view comparable to FIG. 1 except showing the transfer conveyor in accordance with the invention situated between two machines which do not pivot and showing the transfer conveyor in accordance with the invention pivoted obliquely away from the main axis of the food process line;

FIG. 7 is an enlarged-scale end elevational view taken in the direction of arrows VII-VII in FIG. 1, with middle portions broken away; and FIG. 8 is an enlarged-scale side elevational view taken in the direction of arrows VIII-VIII in FIG. 1, partly in section and with portions to left broken away.

DETAILED DESCRIPTION OF THE PREFERRED EMBODIMENTS

Figure 1:
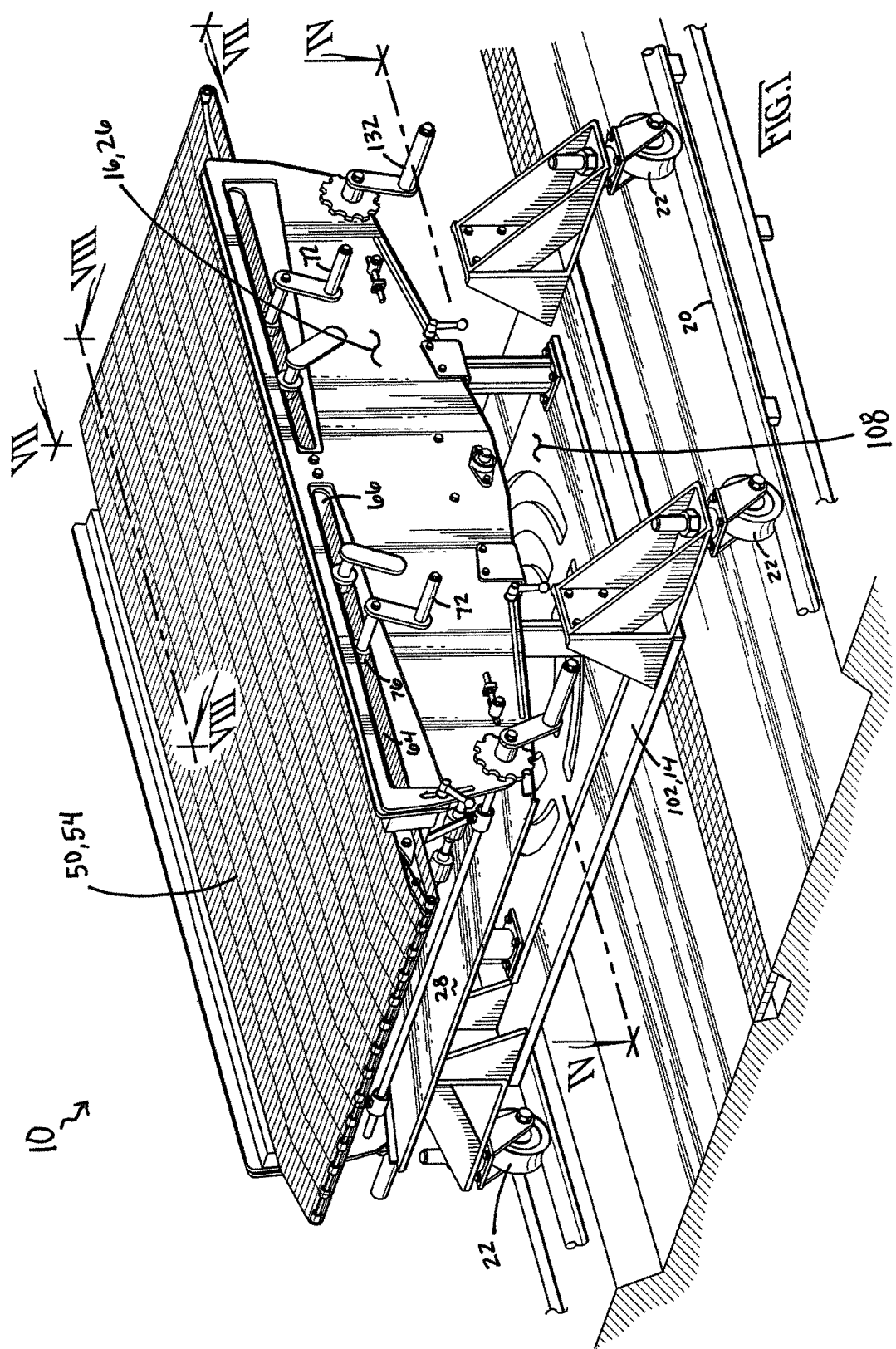
FIG. 1 is a perspective view of a pivoting and reversibly expanding-contracting transfer conveyor in accordance with the invention.

FIGS. 1-8 show a pivoting and reversibly expanding-contracting transfer conveyor 10 in accordance with the invention for food process lines 12.

The transfer conveyor 10 comprises a carriage 14, a turret 16 and pivot hardware 18 interconnecting the carriage 14 and turret 16. The carriage 14 is meant to be stationed as securely as possible in one fixed position in a food process line 12. The drawings show the carriage 14 riding on parallel rails or tracks 20 by U-notched wheels or casters 22 which have locks to prevent rolling or any movement whatsoever, to the extent practical.

The turret 16 comprises spaced side panels 26 spaced between a relatively solid bottom panel 28 and a table plane 30 which is characterized by parallel, longitudinally-elongated and laterally-spaced slide bars 32. There is a multiplicity of laterally extending rods, bars and/or axle shafts 34 (see, eg., FIG. 7) which extend between the spaced side panels 26, and give them rigidity. A subset of these comprise laterally extending course-changing means 41-45 for stretching an endless conveyor belt 50 in a circuit around such course-changing means 41-45. Example course-changing means 41-45 include without limitation rollers, pulleys or non-rotating nose bars and so on.

The endless conveyor belt 50 is preferably a wire mesh belt. Correspondingly, the slide bars 32 defining the table plane 30 comprise low friction synthetic or polymeric materials.

Figure 2:
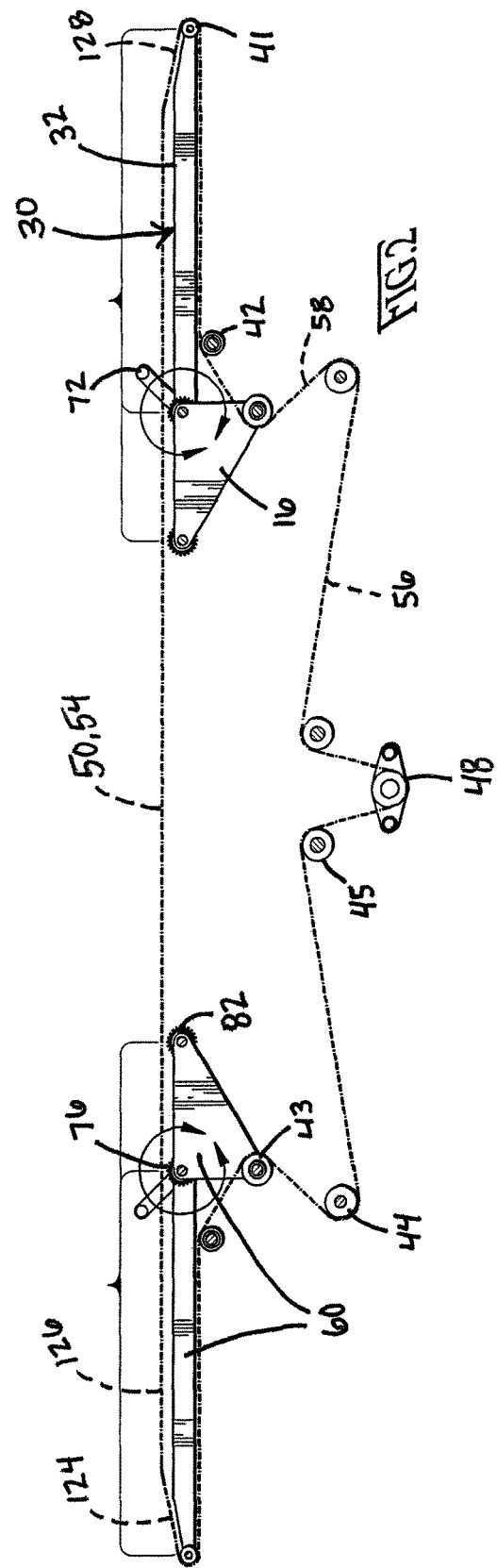
FIG. 2 is a schematic side elevation view of the endless conveyor belt therefor, shown in an expanded position.
Figure 3:
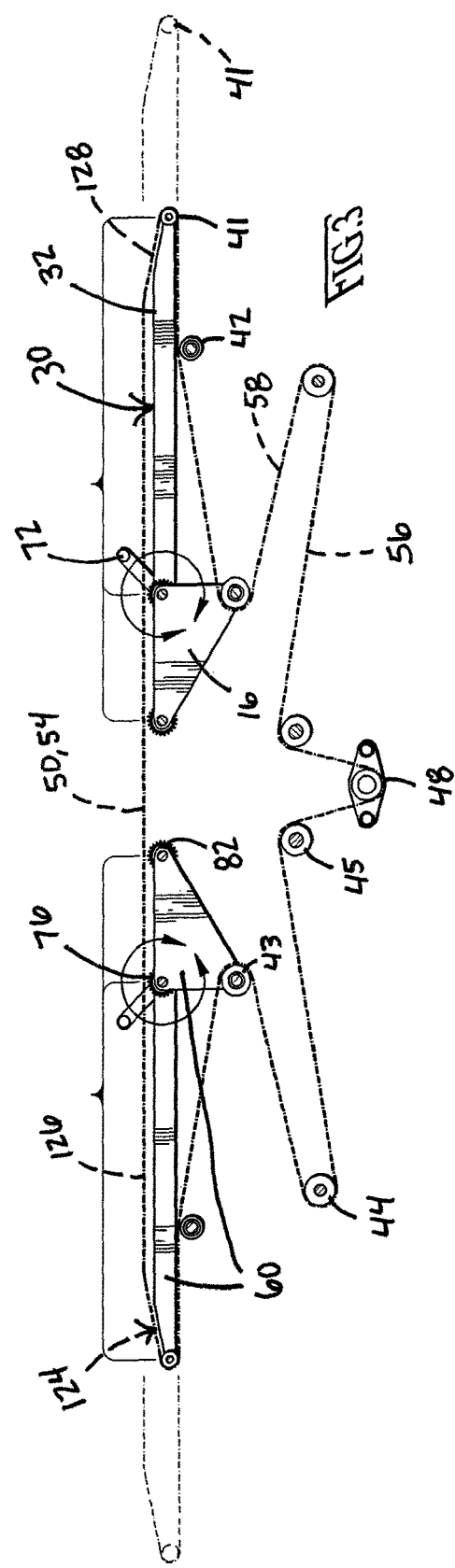
FIG. 3 is a schematic side elevation view comparable to FIG. 2 except showing the endless conveyor belt in a contracted position.

FIGS. 2 and 3 show better that the endless conveyor belt 50 courses a circuit comprising an (upper) food carrying run 54, a (lower) return run 56, and opposite sideways-V shaped pleat runs 58. The belt 50 courses around ten course-changing means 41-45 that are idlers, and then an eleventh driven one 48. These course-changing means 41-45 can take any of a wide variety of designs. The preferred design here is an elongated central shaft 52 (see, eg., FIG. 7) with a series of sprockets 53 (again see, eg., FIG. 7) spaced apart on the shaft 52. For brevity's sake, these are called rollers in this description. The ten idler rollers 41-45 are arranged in symmetric pairs. The eleventh, driven roller 48 centered in the middle of the return run 56. The ten rollers 41-45 arranged in symmetric pairs consist of five rollers 41-45 on each end of the transfer conveyor 10, each having an opposite counterpart on the other end of the transfer conveyor 10. The food carrying run 54 extends between opposite nose rollers 41. Below and inside of the nose rollers 41 are a pair of leveling rollers 42 which ensure that the belt 50 turns smoothly around the respectively proximate nose roller 41. Below and inside of the leveling rollers 42 are a pair of opposite pleat-forming rollers 43. Below and outside of the pleat-forming rollers 43 are a second pair of nose rollers 44 except in service of the return run 56 of the belt 50. Finally, there are a pair of auxiliary rollers 45 for the return run 56 which flank the lone driven roller 48 to ensure good meshing between the driven roller 48 and the belt 50.

Each upper nose roller 41 and the pleat-forming roller 43 on the same end of the transfer conveyor 10 are mounted in common between a pair of brackets 60. The brackets 60 are movable in a plane coplanar with the upper, food-product carrying run 54 between extended and retracted extremes. FIG. 2 shows both pair of brackets 60 (only brackets 60 in the foreground are in view) in their extended extreme position. FIG. 3 shows both pair of brackets 60 (only brackets 60 in the foreground are in view) in their retracted extreme position.

The turret 16 is provided with two pair of elongated rack gears 64 just underneath each of the two pair of brackets 60.

The pair of laterally-spaced sidewalls of the turret 16 is provided with a pair of opposite longitudinally-elongated slots 66. Traveling back and forth in these elongated slots 66 are the axles of a pair of opposite pairs of hand cranks 72 that rotate in journals or bushings for them in the brackets 60. These cranks 72 turn corresponding pinion gears 76 for meshing with respective ones of the rack gears 64. Turning the hand cranks 72 causes the pinion gears 76 to move traveling brackets 60 back and forth on extension and retraction strokes, causing the transfer conveyor 10 to expand and contract between expanded (see, eg., FIG. 2) and contracted extremes (see, eg., FIG. 3).

Again, FIG. 2 shows the expanded extreme and FIG. 3 shows the contracted extreme. Each pair of brackets 60 carries the respective nose roller 41 for the upper, food-product carrying run 54 of the conveyor belt 50 between extended and retracted extremes. Each pair of brackets 60 furthermore carries the respective pleat-forming roller 43 on the same extension and retraction stroke as the proximate nose roller 41 for the upper, food-product carrying run 54 of the conveyor belt 50. That way, the conveyor belt 50 is never slack when cycled between the expanded and contracted extremes for the transfer conveyor 10.

Each bracket 60 is affixed with an inner pinion gear 82, which is an idler compared to the crank pinion gear 76 but helps assist in truing the travel of the bracket 60. Hence each pair of brackets 60 move along extension and retraction strokes in tandem with the respectively proximate nose roller 41, the respectively proximate pleat-forming roller 43, and the respective hand crank 72 and axle therefor.

Hence the crank 72, the traveling bracket 60, the nose roller 41, the pleat-forming roller 43 move back and forth as a unit when one end of the transfer conveyor 10 is in transition back or forth between a contracted state (see, eg., FIG. 3) and an expanded state (see, eg., FIG. 2).

In use, the transfer conveyor 10 would typically be deployed between two machines 84 and 86 while the transfer conveyor 10 is in the expanded state. However, when contracted to the contracted state, FIG. 6 shows that the transfer conveyor 10 can be pivoted to an oblique angle relative the main axis (eg., which can be generally taken as parallel with rails or tracks 20) of the food process line 12, and without having to move (eg., shift apart) either of the machines 84 or 86 immediately upline or downline from the transfer conveyor 10.

This is time-saving aspect of the invention, that the whole process line 12 does not have to be broken apart merely to pivot the transfer conveyor 10 for maintenance and/or washing operations. Pivoting the transfer conveyor 10 as shown in FIG. 6 gives workers better access for washing operations to all of:— the transfer conveyor 10, the machine 84 immediately upline from the transfer conveyor 10, and the machine 86 immediately downline from the transfer conveyor 10.

Figure 4:
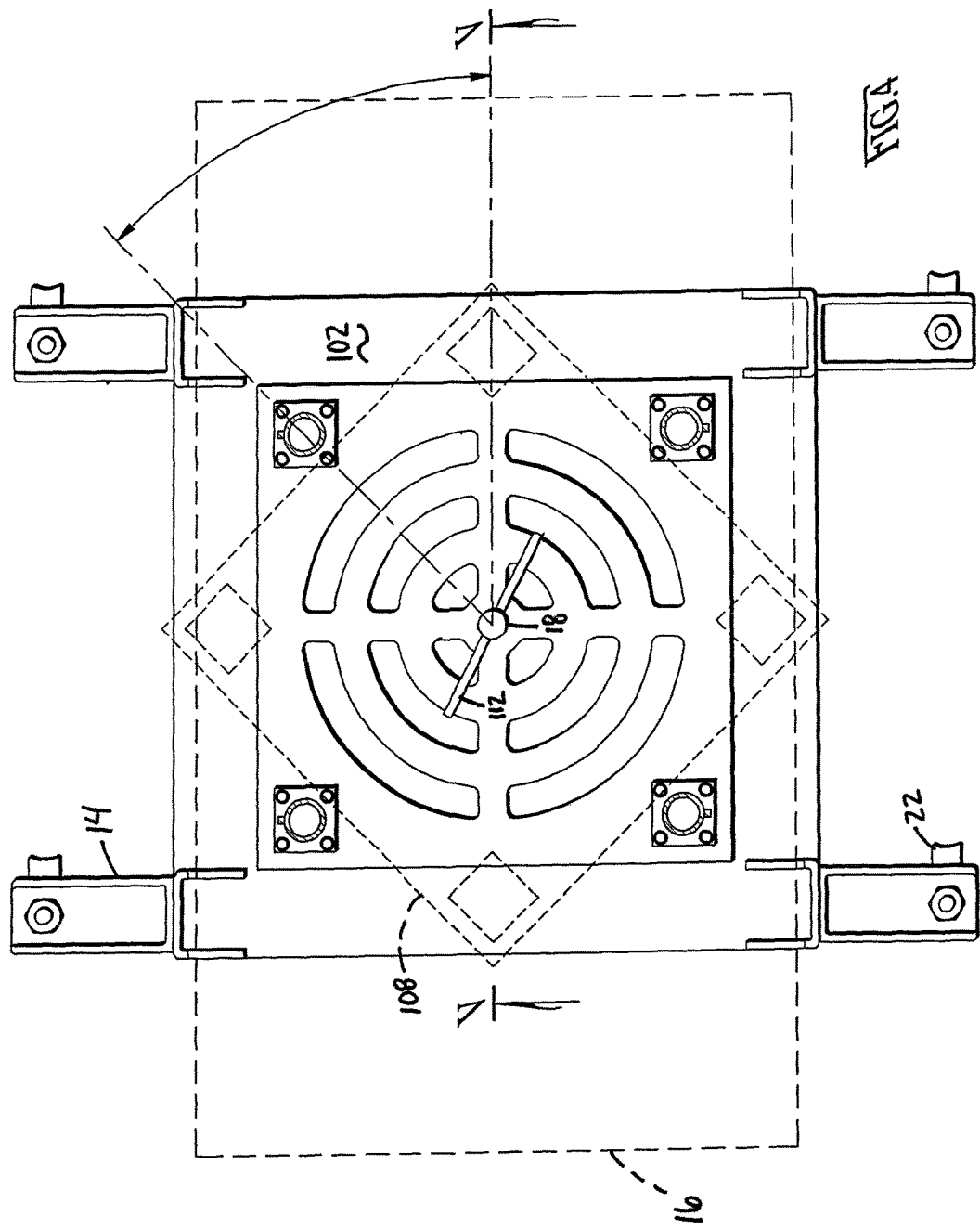
FIG. 4 is a top plan view, partly in section, taken in the direction of arrows IV-IV in FIG. 1.
Figure 5:
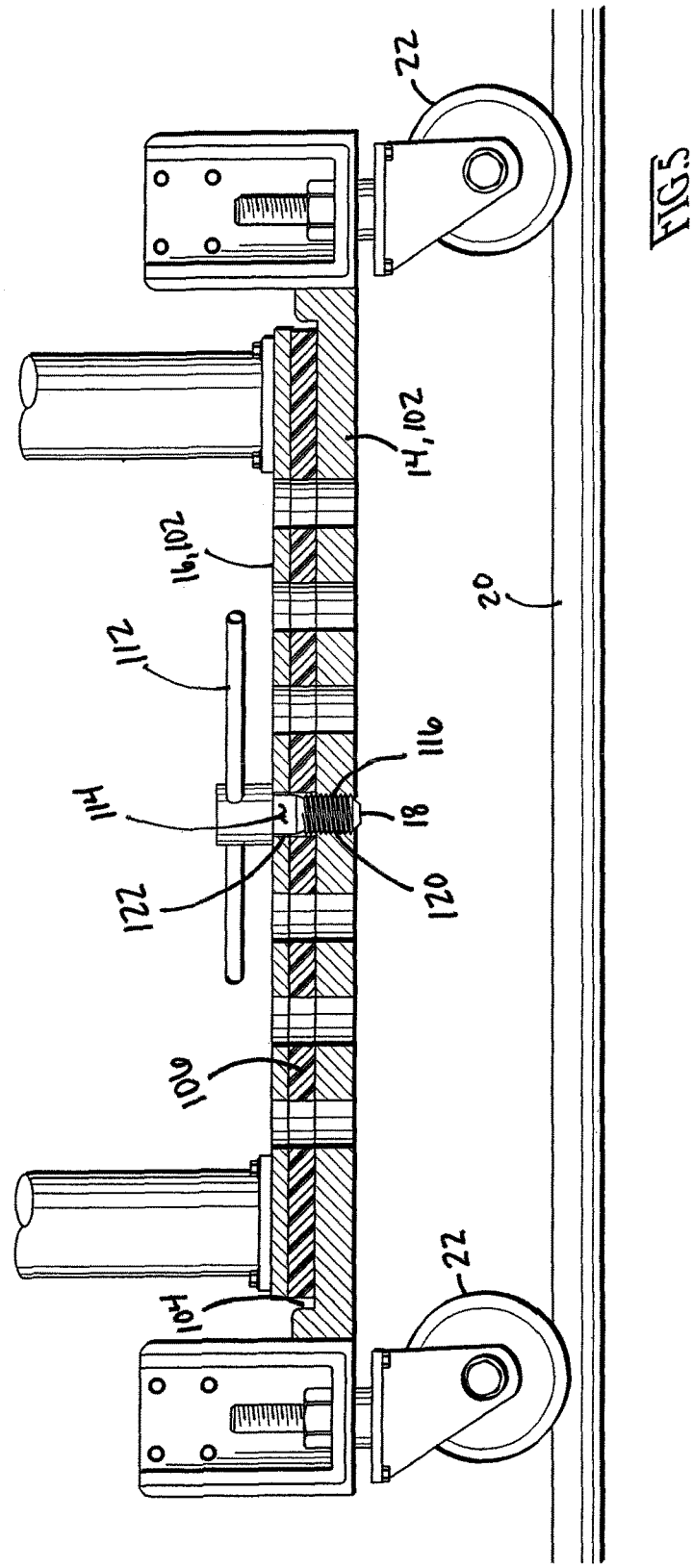
FIG. 5 is an enlarged-scale section view taken along line V-V in FIG. 4.

FIGS. 4 and 5 show better the pivot hardware 18 for the transfer conveyor 10. The carriage 14 has a plate 102 with a cylindrical well 104 recessed into the top of it. A cylindrical bushing 106 of low-friction synthetic or polymeric material is set into this well. The bushing 106 is preferably made of the same material as the slide bars 32. The turret 16 has a bottom plate 108 that rests on top of the bushing 106. The function of a pivot pin 112 is served by a T-headed fastener 112 which has a shank 114,116 that is a smooth cylinder 114 for the half of it proximate the T-head 112 and then threaded portion 116 for the distal half. The plate 102 of the carriage 14 is provided with a threaded socket 120 in the center of the cylindrical recess 104. The bushing 106 and the plate 108 of the turret 16 are provided with smooth bores 122 for aligning with the threaded socket 120 of the carriage 14. Hence the T-headed fastener 112 not only serves as the pivot pin for the pivoting of the turret 16 but also the locking means for locking the turret 16 stationary relative the carriage 14.

It is preferred if the turret 16 can pivot in full 360° revolutions. However, it sufficient if the turret 16 can pivot between much smaller arc extremes, including oblique angles of say 25° or 45° and so on.

FIGS. 7 and 8 show a further functionality of the transfer conveyor 10 in accordance with the invention. As described previously, the turret 16 has at least one sidewall 26 provided with cranks 72 that crank out or crank in the brackets 60 carrying the nose rollers 41 for the upper, food-product carrying run 54 of the conveyor belt 50. As FIGS. 7 and 8 show, that sidewall is provided with a second set of pairs of hand cranks 132, one pair proximate each end of the turret 16. These second sets of hand cranks 132 adjust the upper, food-product carrying run 54 of the conveyor belt 50 anywhere between level or with positive or negative tilt. In fact, the upper, food-product carrying run 54 of the conveyor belt 50 can be adjusted such that one half of it ramps up from the intake end 124 to a crest 126 and the second half of it ramps down to the discharge end 128. The arc extremes of these angles are not great but it does help the transfer conveyor 10 to bridge between machines design for operating on dissimilar conveyor planes.

Given the foregoing, the advantages of the invention include without limitation the following.

A plurality of transfer conveyors 10 can be interspersed in the food process line 12 between much heavier machines 84 and 86. The transfer conveyors 10 will afford the opportunity for a team of workers to 'style' and 'grade' food product as the product exits one machine 84 and prepares to enter an ensuing machine 86. Moreover, the pivoting and reversibly expanding-contracting transfer conveyor 10 affords several further advantages.

One is, shortening the turnaround time between being online for running food product, and being offline for washing. Previously, all the separate machines 84 and 86 of the food process line 12 would have to be spaced apart for washing operations.

Washing operations can be imagined as teams of firefighters with fire hoses spray blasting each machine with a heated solution of sanitizing agents. Washing the food process line 12 previously had to have the following happen:—
1—manually moving each machine 84,86 out of the careful alignment with each other;
2—manually separating the machines 84,86 in order to allow, in particular, the spraying into and through the tunnels of the coating machines (eg., 84); and then
3—manually reassembling the food process line 12;
4—which importantly includes, carefully re-aligning all the equipment 84,86 with respect to each other.

The transfer conveyor 10 comprising a stationed carriage 14, a reversibly expanding and contracting food product carrying run 54 of the conveyor belt 50, which is mounted inside a pivoting turret 16:—offers the following advantages.

To begin a washing operation, no machine 84,86 has to be moved off its parked position of careful alignment. The transfer conveyor 10 allows the nose ends 41 of the belt 50's food carrying run 54 to be contracted from expanded positions. With the functionality of the pivoting turret 16, the food carrying run 54 can be pivoted with free clearance of the both machines 84 and 86 on either side of the transfer conveyor 10.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A food process line transfer conveyor for situating between an immediately upline food process line machine and an immediately downline food process line machine, said transfer conveyor comprising:
   an endless conveyor belt having an upper, food-product carrying run and a lower, return run, the upper, food-product carrying run extending between one nose roller defining an intake end and another nose roller defining a discharge end;
   a turret comprising a central body flanked between one movably mounted assembly for holding out the one nose roller relative to the central body and another movably mounted assembly for holding out other nose roller likewise relative to the central body;
   wherein the movably mounted assemblies are movable between extended and retracted extremes wherein cooperatively the movably mounted assemblies are movable to hold out the respective nose rollers thereof in relative extended and retracted extremes giving the upper food-product carrying run respective extended and retracted states; and
   further comprising a carriage with pivot hardware pivotally propping the turret above the carriage;
   wherein said transfer conveyor can pivot in place to thereby give better access to all of said transfer conveyor, said immediately upline food process line machine and said immediately downline food process line machine for washing and/or maintenance operations.

2. The transfer conveyor of claim 1, wherein:
   said turret being mounted with course-changing hardware for supporting and tensioning the endless conveyor belt, said course-changing hardware including the spaced nose rollers between which is defined the upper, food-product carrying run;
   said movably mounted assemblies further comprises two pair of movable brackets, one pair of movable brackets for supporting one nose roller and the other pair of movable brackets for support the other nose roller;
   said movable brackets having extension and retraction strokes that correspondingly give the upper, food-product carrying run expanded and contracted states;
   said at least one transfer conveyor being scaled and configured such said at least one transfer conveyor can pivot in place between the at least one food process line machine and the at least one other food process line machine without moving either.

3. The transfer conveyor of claim 1, further comprising:
   a pair of parallel tracks; and
   rolling riding gear for carrying the carriage of the transfer conveyor, said immediately upline food process line machine and said immediately downline food process line machine, which rolling riding gear ride on the tracks whereby the transfer conveyor, said immediately upline food process line machine and said immediately downline food process line machine can be rolled into cooperative position with one another or rolled apart as for re-building a different sequence of machines for a food process line with another purpose.

* * * * *